(12) United States Patent
Muster et al.

(10) Patent No.: US 10,686,349 B2
(45) Date of Patent: Jun. 16, 2020

(54) HOLLOW SHAFT ARRANGEMENT

(71) Applicants: THYSSENKRUPP PRESTA TECCENTER AG, Eschen (LI); thyssenkrupp AG, Essen (DE)

(72) Inventors: Manfred Muster, Ludesch (AT); Daniel Paul, Burkhardtsdorf (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 261 days.

(21) Appl. No.: 15/577,842

(22) PCT Filed: Jun. 1, 2016

(86) PCT No.: PCT/EP2016/062316
§ 371 (c)(1),
(2) Date: Nov. 29, 2017

(87) PCT Pub. No.: WO2016/193277
PCT Pub. Date: Dec. 8, 2016

(65) Prior Publication Data
US 2018/0147937 A1    May 31, 2018

(30) Foreign Application Priority Data
Jun. 3, 2015   (DE) .......................... 10 2015 108 817

(51) Int. Cl.
*H02K 9/22*   (2006.01)
*H02K 9/00*   (2006.01)
(Continued)

(52) U.S. Cl.
CPC .............. *H02K 9/22* (2013.01); *H02K 9/005* (2013.01); *B60K 6/26* (2013.01);
(Continued)

(58) Field of Classification Search
CPC ............ H02K 9/22; H02K 9/005; H02K 5/18; H02K 1/32; H02K 9/00; Y10T 464/10;
(Continued)

(56) References Cited

U.S. PATENT DOCUMENTS 3,099,141 A * 7/1963 Garten ..................... G21D 5/02
464/17
4,014,184 A * 3/1977 Stark ....................... B23P 19/02
(Continued)

FOREIGN PATENT DOCUMENTS

CH          67317 A    12/1914
CN     101752968 A     6/2010
(Continued)

OTHER PUBLICATIONS

English translation of International Search Report issued in PCT/EP2016/062316 dated Aug. 2, 2016 (dated Aug. 10, 2016).
(Continued)

*Primary Examiner* — Greg Binda
(74) *Attorney, Agent, or Firm* — thyssenkrupp North America, LLC

(57) ABSTRACT

A hollow shaft arrangement may include a hollow shaft, such as a rotor shaft of an electric motor, for example, through which a fluid can pass for cooling purposes. Surface-enlarging cooling structures for transferring thermal energy from the hollow shaft to the fluid may be arranged in an inner space of the hollow shaft. The surface-enlarging cooling structures may be connected to the hollow shaft, but may be part of a cooling body that is formed separately from the hollow shaft. Further, the cooling body may include a sleeve-like main body from which the surface-enlarging cooling structures project radially inwardly, and the sleeve-like main body may include an axial gap that permits a circumference of the main body to be adjustable. In some
(Continued)

cases an outer diameter of the cooling body is larger than an inner diameter of the bearing.

9 Claims, 2 Drawing Sheets

(51) Int. Cl.
  *B60K 1/00* (2006.01)
  *B60K 6/26* (2007.10)
  *F16C 3/02* (2006.01)
  *H02K 5/18* (2006.01)

(52) U.S. Cl.
  CPC ..... *B60K 2001/006* (2013.01); *B60Y 2306/05* (2013.01); *F16C 3/02* (2013.01); *H02K 5/18* (2013.01); *Y10T 464/10* (2015.01)

(58) Field of Classification Search
  CPC .... B60K 6/26; B60K 2001/006; B60K 17/24; B60K 1/00; B60K 17/22; B60Y 2306/05; B60Y 2304/07; F16C 3/02
  USPC ................ 464/17–21, 183; 310/60 A, 61, 65
  See application file for complete search history.

(56) References Cited

U.S. PATENT DOCUMENTS

| 4,840,222 | A | 6/1989 | Lakin |
| 5,489,810 | A | 2/1996 | Ferreira |
| 5,731,643 | A | 3/1998 | Avakian |
| 10,294,982 | B2 * | 5/2019 | Gabrys ................... F16C 3/02 |

| 2002/0195887 | A1 | 12/2002 | Kobayashi |
| 2003/0146667 | A1 | 8/2003 | Hattori |
| 2005/0285460 | A1 | 12/2005 | Kaiser |
| 2008/0007916 | A1 | 1/2008 | Hogg |
| 2012/0112578 | A1 | 5/2012 | Telakowski |

FOREIGN PATENT DOCUMENTS

| CN | 204089478 U | 1/2015 |
| CN | 204349702 U | 5/2015 |
| DE | 951464 C | 10/1956 |
| DE | 1120606 B | 12/1961 |
| DE | 1922765 B | 7/1972 |
| DE | 102008001607 A | 11/2009 |
| DE | 102008043367 A | 5/2010 |
| DE | 102009000591 A | 8/2010 |
| EP | 2595283 A | 5/2013 |
| JP | 9150344 A | 6/1997 |
| JP | 9-512697 A | 12/1997 |
| JP | 2002034189 A | 1/2002 |
| JP | 2002-537747 A | 11/2002 |
| JP | 2003079101 A | 3/2003 |
| JP | 2003-235210 A | 8/2003 |
| JP | 2006-230154 A | 8/2006 |
| KR | 1020010021235 A | 3/2001 |
| SU | 1236584 A | 6/1986 |
| WO | 2007094350 A | 8/2007 |

OTHER PUBLICATIONS

English abstract for DE102008001607.
English abstract for DE102008043367.
English abstract for DE102009000591.

* cited by examiner

HOLLOW SHAFT ARRANGEMENT

CROSS REFERENCE TO RELATED APPLICATIONS

This application is a U.S. National Stage Entry of International Patent Application Serial Number PCT/EP2016/062316, filed Jun. 1, 2016, which claims priority to German Patent Application No. DE 10 2015 108 817.7, filed Jun. 3, 2015, the entire contents of both of which are incorporated herein by reference.

FIELD

The present disclosure generally relates to hollow shaft arrangements and methods for assembling hollow shaft arrangements.

BACKGROUND

DE 10 2008 043 367 A1 discloses a hybrid drive device for a motor vehicle, having an internal combustion engine and an electric motor, in each case for driving the motor vehicle. A rotor of the electric motor is arranged on a hollow shaft in the drivetrain. Means for conveying a cooling fluid convey said cooling fluid through the inner space of the hollow shaft in order to cool the rotor and the hollow shaft.

Cooling fins are arranged in the inner space of the hollow shaft in order to transfer the heat to the cooling fluid in the best way possible. The cooling fins are formed integrally on the inner wall of the hollow shaft in a fairly complex manner. Also, the inner diameter of the hollow shaft, and thus the diameter of the region which is able to be used for the cooling, is quite small in size, this resulting in a limited cooling performance.

Thus a need exists for a hollow shaft arrangement that offers a simple construction, very good cooling behavior and ease of assembly.

DETAILED DESCRIPTION

Figure 1:
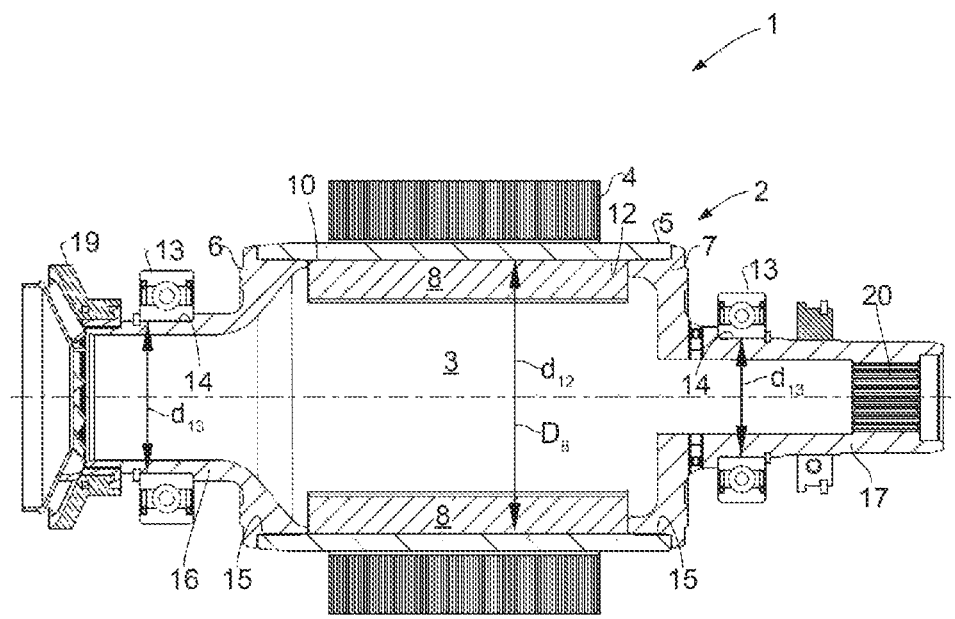
FIG. 1 is a longitudinal sectional view of an example hollow shaft arrangement.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to the invention, a hollow shaft arrangement, in particular for the drivetrain of a hybrid motor vehicle, comprising a hollow shaft, in particular a rotor shaft of an electric motor, through which shaft a fluid is able to pass for the purpose of cooling, is provided. Surface-enlarging cooling structures, in particular cooling fins, for transferring thermal energy from the hollow shaft to the fluid are arranged in an inner space of the hollow shaft. The cooling structures are connected to the hollow shaft. The hollow shaft arrangement is characterized in that the cooling structures are part of a cooling body which is formed separately from the hollow shaft.

The cooling body is thus produced separately from the hollow shaft. In this case, materials which have high thermal conductivity but are not subject to high requirements regarding strength are suitable for the production of the cooling body. In particular, aluminum-based alloys have proven to be advantageous. The production of the hollow shaft itself is simplified since no complex cooling structures are to be formed in the interior of the relatively long hollow shaft.

The cooling body is advantageously held in the inner space in a force-fitting manner. In particular, the cooling body is clamped in radially in the inner space. Advantageously, no further radial fastening is provided, and the cooling body is thus held in the inner space only by way of the force-fitting connection acting in the radial direction. For this purpose, a radially compressible cooling body is used in particular, which, in an unstressed state, has an outer diameter which is larger than the inner diameter of the hollow shaft into which the cooling body is inserted. For the assembly, the cooling body is radially compressible, that is to say the outer diameter of the cooling body can be reduced by radial, mechanical loading and in the process in particular prestressed, such that the outer diameter is smaller than the inner diameter of the hollow shaft. The cooling body is then inserted into the hollow shaft; subsequently, the radial loading is removed, whereby the cooling body re-expands, in particular in this case springs back elastically, and is supported radially against the inner wall of the hollow shaft in a force-fitting manner.

An outer diameter of the cooling body is advantageously larger than an inner diameter of a bearing, in particular of two bearings, for mounting the hollow shaft. Consequently, good cooling capacities are possible due to a large cooling body and large contact surfaces between the cooling body and the hollow shaft; at the same time, radially small and thus low-cost and light bearings for mounting the hollow shaft are used, said bearings also being characterized by relatively low friction losses during operation.

An outer circumferential surface of the cooling body is advantageously formed so as to complement an inner circumferential surface of the hollow shaft, in particular the outer circumferential surface and the inner circumferential surface are formed cylindrically with a mutually corresponding outer diameter and inner diameter, respectively. "The mutually corresponding outer and inner diameters" means in particular the diameters in the assembled state of the arrangement. As a result of the complementary configuration, a large contact surface is provided between the hollow shaft and the cooling body, this promoting a favorable heat transfer capacity. Moreover, a hollow shaft with a cylindrical inner surface is easily producible.

The cooling body advantageously comprises a sleeve-like main body from which the cooling structures project radially inwardly. The sleeve-like main body provides in particular the cylindrical surface which serves for abutment with the hollow shaft. In particular, with corresponding dimensioning, the sleeve-like form is conducive to the elasticity required for the radial compressibility.

The sleeve-like main body advantageously acquires the radial compressibility in that the main body has a circumferential region which is able to be reduced in the circumferential direction. Said circumferential region is formed in particular by an axial gap. Said circumferential region allows the outer circumference and thus the outer diameter of the sleeve-like main body to be reducible without plastic deformation. Furthermore, said circumferential region makes it possible for there to be at all times an optimal abutment between the cooling body and the hollow shaft, both at low temperatures and at high temperatures, despite the different thermal expansion coefficients of the materials of the hollow shaft and the cooling body. Said reducible circumferential region, in particular the axial gap, advantageously extends over the entire axial length of the main body.

In an advantageous refinement, two ends of the sleeve-like main body, which are separated from one another by the above-described circumferential region, are connected to one another via a radially inwardly projecting expansion fold. Even in the case of a relatively small reduction in the circumference of the sleeve-like main body, said expansion fold is subjected to relatively large deformation, as a result of which high prestressing can be achieved. The parameters of the deformability, and thus the dimension of the prestressing, can be set by dimensioning the expansion fold.

The hollow shaft is advantageously of multi-part form and comprises, prior to the final assembly, at least one, in particular sleeve-like, receptacle part with an axial opening for inserting the cooling body and comprises at least one closure part for closing off the axial opening. The receptacle part and the closure part are connected fixedly to one another, for example by way of an interference fit, during the assembly. Prior to this, however, the cooling body is inserted into the inner space of the hollow shaft through the opening. Subsequently, the hollow shaft is closed off by the closure part. The closure part is formed in particular as a flange, which is, for example, formed in one piece with a joinable shaft section.

The invention further relates to a method for assembling a hollow shaft arrangement of the above-described type, comprising the following method steps: reducing, in particular reducing in an elastic manner, the radial dimension of the cooling body by way of radially inwardly acting force loading; inserting the cooling body, which is thereby reduced in the radial direction, through an axial opening into the inner space; removing the radial loading, with the result that the cooling body increases radially, in particular in an elastic manner, and undergoes force-fitting connection to the hollow shaft. The cooling body in the installed state advantageously has an outer diameter which is reduced by at least 0.5% in comparison with the cooling body in the non-installed state, which results in the radial prestressing which is necessary for the force-fitting connection between the hollow shaft and the cooling body over a large temperature range. Reference is made to the advantages specified in relation to the device and to further configuration possibilities. Due to the elastic shape-changing behavior, in particular full contact between the hollow shaft and the cooling body, and thus high heat transfer capacity, is ensured over different operating temperatures.

FIG. 1 shows a hollow shaft arrangement 1 according to the invention, which may be used for example in a drivetrain of a hybrid vehicle. The hollow shaft arrangement 1 comprises a rotor shaft 2 which is in the form of a hollow shaft. A rotor of an electric motor is fastened on an outer circumference of the rotor shaft 2. The lamination pack 4 of the rotor can be seen. On one axial end of the rotor shaft 2, said shaft comprises a first shaft section 16, to which an internal combustion engine is able to be connected. A fan wheel 19, via which a cooling fluid is conveyed into the inner space 3 of the hollow shaft, is arranged between the internal combustion engine and the rotor shaft 2. On the other axial end of the rotor shaft 2, said shaft comprises a second shaft section 17 with an internal toothing 20, to which a shift gearbox (not illustrated), which is connected to a drive axle, is able to be connected. The rotor shaft 2 is mounted relative to a vehicle body or a vehicle frame via two rolling bearings 13. Situated on the two shaft sections 16, 17 are in each case bearing seats 14 for said rolling bearings 13.

The rotor shaft 2 is of multi-part form and comprises a separate receptacle part 5 in an axially central region. The receptacle part 5 is of sleeve-like form and has both a cylindrical outer surface and a cylindrical inner surface 12. Said sleeve-like receptacle part 5 defines a radially internal inner space 3 in which there is arranged a cooling body 8 which is presented in even more detail on the basis of FIGS. 2 and 3. At both axial ends, the sleeve-like receptacle part 5 comprises in each case openings 15 which are closed off by a first closure part 6 or a second closure part 7. Joined integrally to said first and second closure parts 6, 7 are the first and the second shaft sections 16, 17, respectively.

The rotor shaft 2 is thus formed from the first shaft section 16, the first closure part 6, the receptacle part 5, the second closure part 7 and the second shaft section 17. The two closure parts 6, 7 are each connected fixedly to the receptacle part 5, for example by way of an interference fit or a weld seam. It can be seen that, in the assembled state, an outer diameter $D_8$ of the cooling body 8 and an inner diameter $d_{12}$ of the cylindrical inner surface 12 are significantly larger than the inner diameters $d_{13}$ of the two rolling bearings 13. It is thus possible, in the case of the present rotor shaft 2, to provide small rolling bearings, but nevertheless to use a cooling body 8 having a relatively large diameter. Until now, these two properties have been mutually exclusive.

FIGS. 2a and 2b illustrate the cooling body 8 in detail. The cooling body 8 comprises a sleeve-like main body 18 from which a multiplicity of cooling fins 9 project radially inwardly. An outer circumferential surface 10 of the sleeve-like main body 18 is of almost cylindrical form. The sleeve-like main body 18 has an axial gap 11 extending over the entire axial length, whereby the main body 18 is in principle compressible in a radially elastic manner. Radial compression allows the cooling body 8 to be radially prestressed. It is possible for the main body 18 to expand from this compressed state automatically, as soon as loading which produces the compression is not present. Formed as a result of the axial gap 11 are two exposed ends 21 of the main body 18 as seen in the circumferential direction U.

The radial compressibility is utilized during the assembly of the arrangement. The cooling body 8 comprises, in the non-assembled state, an outer diameter $D_8$ which is initially larger than the inner diameter $d_{12}$ of the inner surface 12 of the receptacle part 5. For the assembly, the cooling body 8 is radially compressed by way of radial loading and is thus prestressed. In this case, the outer diameter $D_8$ of the cooling body 8 is reduced in an elastic manner such that said diameter is smaller than the inner diameter $d_{12}$ of the inner surface 12. In this state, the cooling body 8 is inserted through one of the axial openings 15 into the inner space 3. The radial loading is then removed, and the cooling body springs back in an elastic manner. In this case, the cooling body 18 expands radially and strives to return to its starting state. Since the inner diameter $d_{12}$ of the receptacle part 5 is smaller than the outer diameter $D_8$ of the cooling body 8 in the unstressed state, the cooling body 8 then presses against the inner surface 12 of the receptacle part 5 radially from the inside and thus undergoes force-fitting fastening to the receptacle part 5. Further radial fastening is no longer necessary. As can be seen from FIG. 1, it is possible, however, for axial, form-fitting positioning of the cooling body 8 inside the inner space 3 to be performed by way of the two closure parts.

Cooling bodies 8 whose outer diameters $D_8$ in the non-installed state are at least 0.5%, and in particular at most 2.5%, larger than the expected radial installation space, which is defined by the inner diameter $d_{12}$, are particularly suitable. Although the compressibility of the cooling body could be increased by enlarging the axial gap in the circumferential direction, this leads to the outer surface of the cooling body being reduced, which lowers the heat transfer capacity of the cooling body due to there being less contact with the hollow shaft. It is therefore preferable to limit the axial gap and thus the compressibility to what is absolutely necessary.

In a particularly suitable material pairing, the receptacle part 5 is a steel part and the cooling body 8 is an aluminum part.

In the case of an exemplary outer diameter $D_8$ of approx. 80 mm, the axial gap 11 has a gap width B between 0.5 mm and 10 mm, advantageously approximately 1.2 mm in the installed state and at 20° C.

In the configuration according to the invention, the dimensions of the cooling body 8 are independent of the bearing inner diameter $d_{13}$ of the rolling bearings 13. The bearing inner diameter $d_{13}$ may thus be chosen to be quite small, and at the same time the cooling body 8 may, independently thereof, be designed according to the required heat transfer capacity. Owing to the large cylindrical contact surface between the inner surface 12 of the receptacle part 5 and the cooling body 8, there is a large contact surface for the heat transfer, wherein the full-surface contact between the cylindrical inner surface 12 of the receptacle part 5 and the cylindrical outer surface 10 of the cooling body 8 is ensured by the elastic prestressing over a large temperature range.

Figure 2:
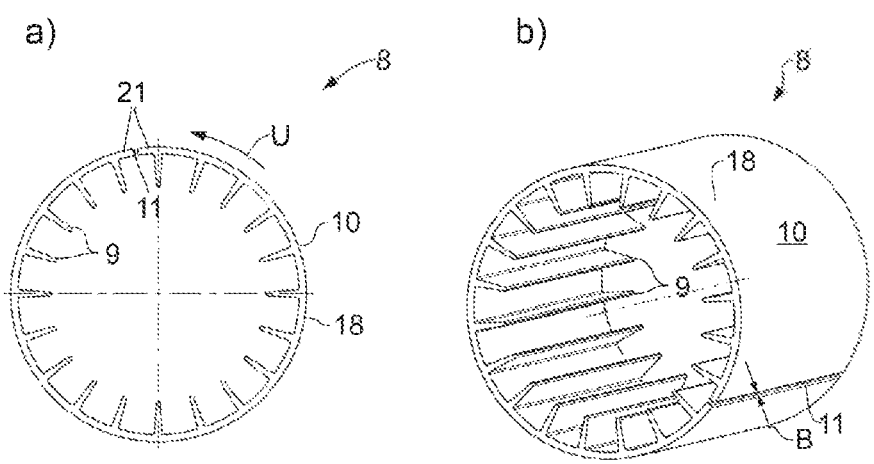
FIG. 2a is a front view of an example cooling body of the hollow shaft arrangement according to FIG. 1.
FIG. 2b is a perspective view of the example cooling body of the hollow shaft arrangement according to FIG. 1.
Figure 3:
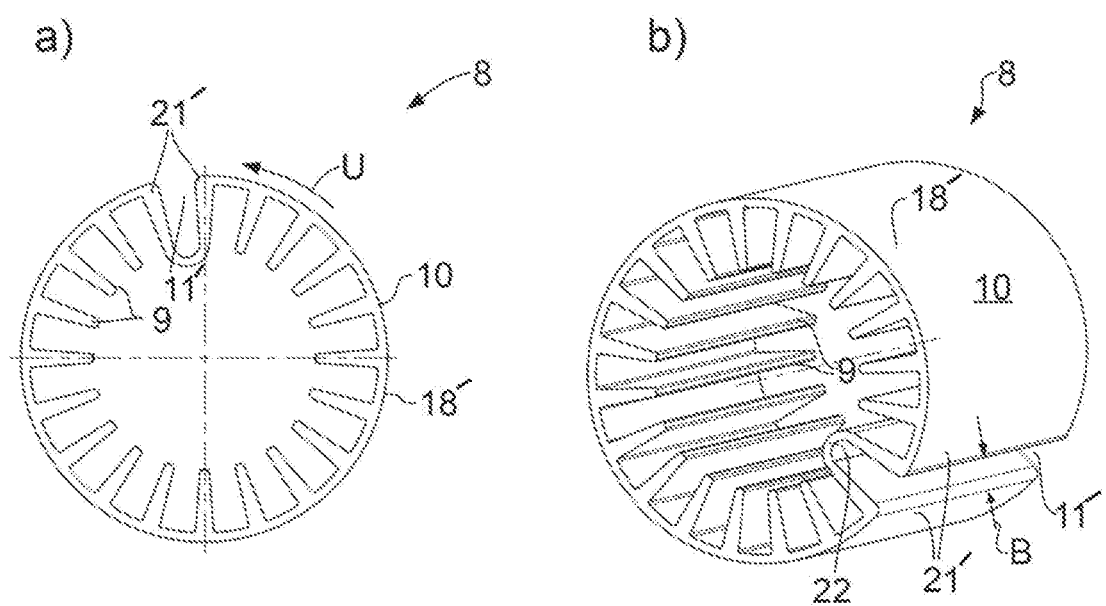
FIG. 3a is a front view of a refinement of the cooling body of the hollow shaft arrangement according to FIG. 1.
FIG. 3b is a perspective view of the refinement of the cooling body of the hollow shaft arrangement according to FIG. 1.

FIG. 3 shows a refinement of the cooling body as per FIG. 2. The two ends 21' of the sleeve-like main body 18', which are separated from one another by the axial gap 11', are connected to one another via a radially inwardly projecting expansion fold 22. The expansion fold is of U-shaped form in the present case. The design of the expansion fold has considerable influence on the elastic parameters of the sleeve-like main body. The elasticity of the expansion fold and thus the elasticity of the main body can be set by way of the wall thickness, the size and the shape of the expansion fold 22.

The invention is not restricted, with regard to its embodiment, to the exemplary embodiment specified above. Rather, numerous variants which make use of the presented solution even in fundamentally different embodiments are conceivable. All the features and/or advantages which emerge from the claims, the description or the drawings, including structural details or spatial arrangements, may be essential to the invention both individually and in a wide variety of different combinations.

LIST OF REFERENCE SIGNS

1 Hollow shaft arrangement
2 Hollow shaft/Rotor shaft
3 Inner space
4 Lamination pack of a rotor of an electric motor
5 Receptacle part
6 First closure part
7 Second closure part
8 Cooling body
9 Cooling fins
10 Cylindrical outer surface of the cooling body
11 Axial gap
12 Cylindrical inner surface of the receptacle part
13 Rolling bearing
14 Bearing seat
15 Opening in the central part
16 First shaft section
17 Second shaft section
18 Sleeve-like main body
19 Fan wheel
20 Internal toothing
21 End of the sleeve-like main body
22 Expansion fold
D8 Outer diameter of the cooling body
d12 Inner diameter of the cylindrical inner surface of the receptacle part
d13 Inner diameter of the rolling bearing
B Gap width
U Circumferential direction

What is claimed is:

1. A hollow shaft arrangement comprising:
a hollow shaft through which fluid is passable for cooling purposes;
a bearing in which the hollow shaft is rotatably mounted; and
surface-enlarging cooling structures disposed in an inner space of the hollow shaft, the surface-enlarging cooling structures configured to transfer thermal energy from the hollow shaft to the fluid, wherein the surface-enlarging cooling structures are connected to the hollow shaft and are part of a cooling body that is formed separately from the hollow shaft, wherein the cooling body comprises a sleeve-like main body from which the surface-enlarging cooling structures project radially inwardly, wherein the sleeve-like main body includes an axial gap,
wherein an outer diameter of the cooling body is larger than an inner diameter of the bearing.

2. The hollow shaft arrangement of claim 1 wherein the hollow shaft is a rotor shaft of an electric motor.

3. The hollow shaft arrangement of claim 1 wherein the cooling body is held in the inner space of the hollow shaft in a force-fitting manner.

4. The hollow shaft arrangement of claim 1 wherein the cooling body is sized to securely fasten radially in the inner space of the hollow shaft.

5. The hollow shaft arrangement of claim 1 wherein a circumference of the sleeve-like main body is adjustable.

6. The hollow shaft arrangement of claim 1 wherein two ends of the sleeve-like main body that are separated by the axial gap are connected to one another via a radially inwardly projecting expansion fold.

7. The hollow shaft arrangement of claim 1 wherein the hollow shaft is of multi-part form, wherein the hollow shaft comprises:
 a receptacle part with an axial opening for accommodating the cooling body; and
 a closure part for closing off the axial opening.

8. A method for assembling a hollow shaft arrangement comprising a hollow shaft through which fluid is passable for cooling purposes; a bearing in which the hollow shaft is rotatably mounted; and surface-enlarging cooling structures disposed in an inner space of the hollow shaft, the surface-enlarging cooling structures configured to transfer thermal energy from the hollow shaft to the fluid, wherein the surface-enlarging cooling structures are connected to the hollow shaft and are part of a cooling body that is formed separately from the hollow shaft, wherein the cooling body comprises a sleeve-like main body from which the surface-enlarging cooling structures project radially inwardly, wherein the sleeve-like main body includes an axial gap, wherein an outer diameter of the cooling body is larger than an inner diameter of the bearing, the method comprising:
 reducing a radial dimension of the cooling body by way of radially inwardly-acting force loading;
 inserting the cooling body, with the reduced radial dimension, through an axial opening into the inner space of the hollow shaft; and
 removing the radially inwardly-acting force loading, which causes the cooling body to expand radially and form a force-fitting connection with the hollow shaft.

9. The method of claim 8 wherein in an installed state the cooling body has an outer dimension that is reduced by at least 0.5% relative to the cooling body in a non-installed state.

* * * * *